(12) United States Patent
Miranda et al.

(10) Patent No.: US 6,992,126 B2
(45) Date of Patent: Jan. 31, 2006

(54) NIOBIUM BASED PAINTS AND COATINGS, ITS OXIDES AND ANTICORROSIVE USE

(75) Inventors: Luiz Roberto Miranda, Rio de Janeiro (BR); Ladimir José Carvalho, Rio de Janeiro (BR); Antônio Carlos Pereira, Rio de Janeiro (BR)

(73) Assignee: COPPE/UFRJ-Coordenacao dos Programas de Pos Graduacao de Engenharia da Universidade Federal do Rio de Janeiro, Rio de Janeiro (BR)

( * ) Notice: Subject to any disclaimer, the term of this patent is extended or adjusted under 35 U.S.C. 154(b) by 98 days.

(21) Appl. No.: 10/471,358

(22) PCT Filed: Sep. 4, 2001

(86) PCT No.: PCT/BR01/00111

§ 371 (c)(1),
(2), (4) Date: Sep. 11, 2003

(87) PCT Pub. No.: WO02/072712

PCT Pub. Date: Sep. 19, 2002

(65) Prior Publication Data

US 2004/0132885 A1   Jul. 8, 2004

(30) Foreign Application Priority Data

Mar. 12, 2001  (BR) .................................. 0102414

(51) Int. Cl.
    *C08K 3/22*   (2006.01)
(52) U.S. Cl. ..................... 524/408; 524/430
(58) Field of Classification Search ............... 524/408, 524/430

See application file for complete search history.

(56) References Cited

U.S. PATENT DOCUMENTS

| | | | |
|---|---|---|---|
| 5,290,354 A | 3/1994 | Haluska | 106/479 |
| 5,312,868 A | 5/1994 | Abe et al. | 525/124 |

FOREIGN PATENT DOCUMENTS

| | | | |
|---|---|---|---|
| JP | 60-212019 | * | 10/1985 |
| JP | 05-001245 | * | 1/1993 |
| JP | 5-1245 | * | 1/1993 |
| JP | 05 05012245 | | 1/1993 |

* cited by examiner

*Primary Examiner*—Peter Szekely
(74) *Attorney, Agent, or Firm*—Fildes & Outland, P.C.

(57) ABSTRACT

The present invention refers to compositions and coatings, having the niobium, its oxides and possible associations with other oxides as a pigment, and its utilization carried out by the usual techniques of painting, acting as an anticorrosive to organic acids, particularly the naphthenic acids in sulfide medium, persistently present in the petrochemical industry.

4 Claims, 4 Drawing Sheets

Figure 1:
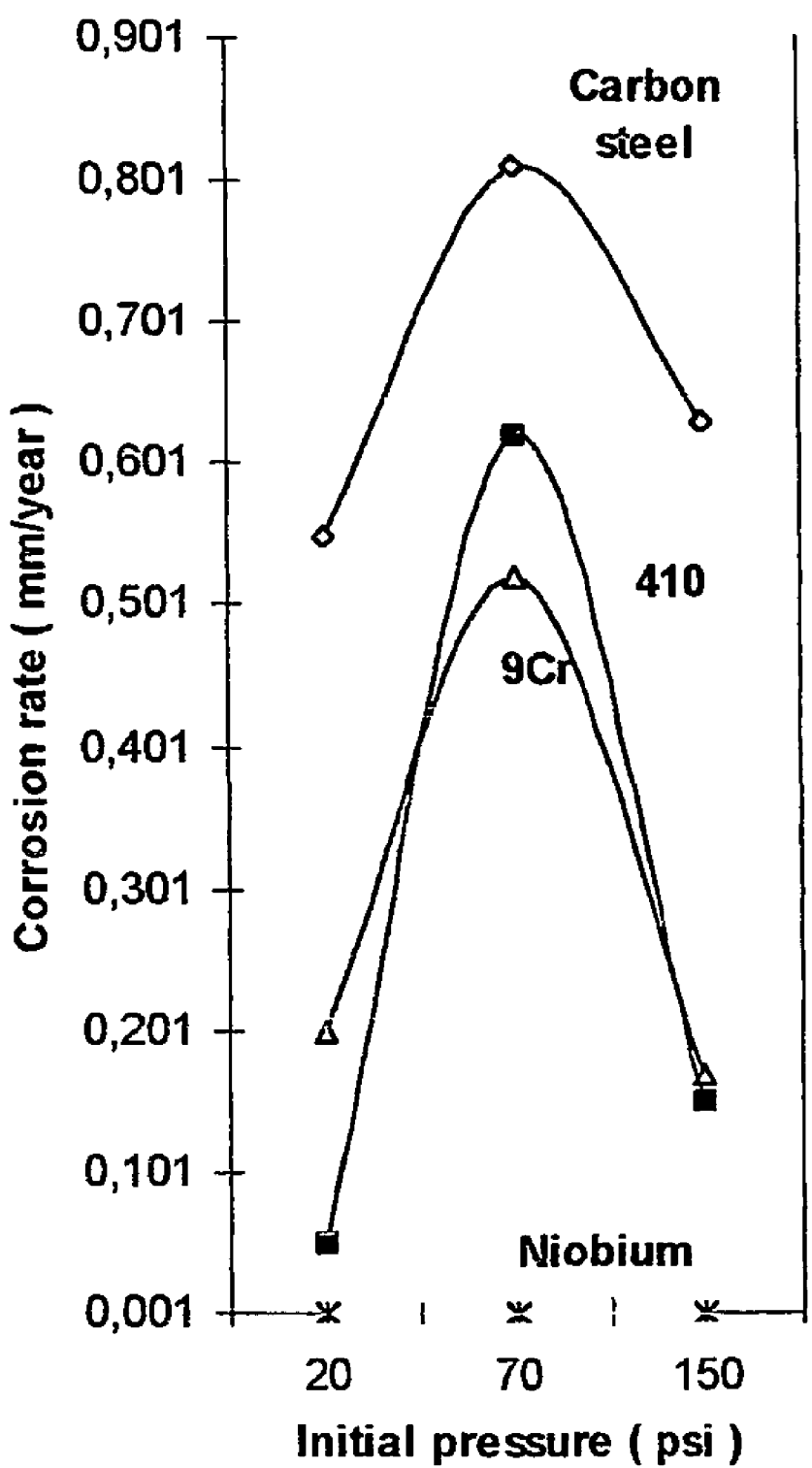

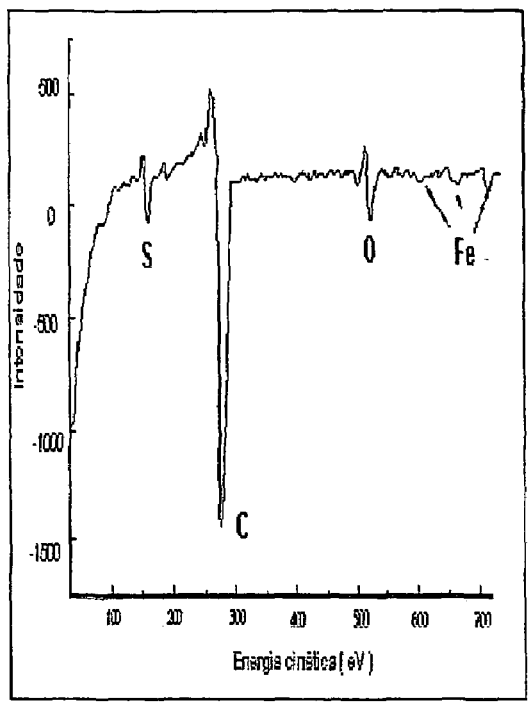
Figure 2 - Carbon steel superfice.
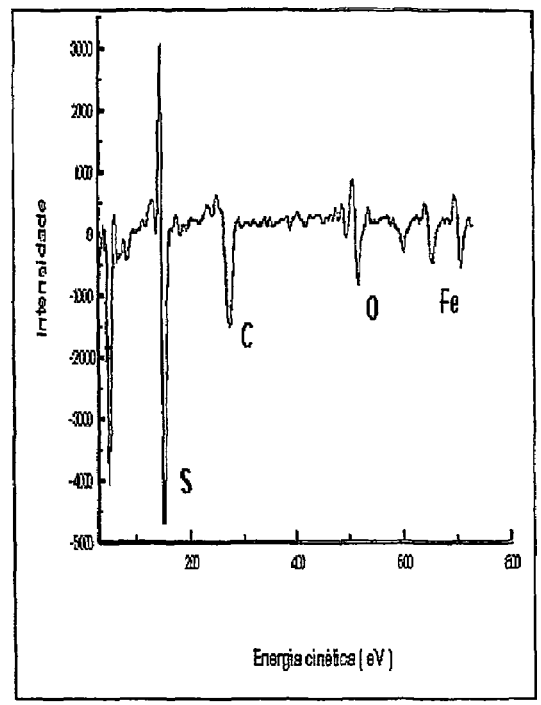
Figure 3 - Carbon steel later 30 s.
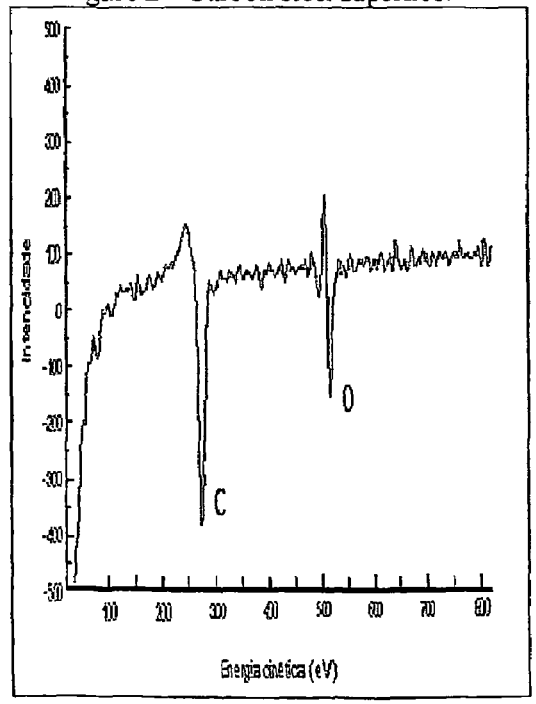
Figure 4 - Niobium superfice.
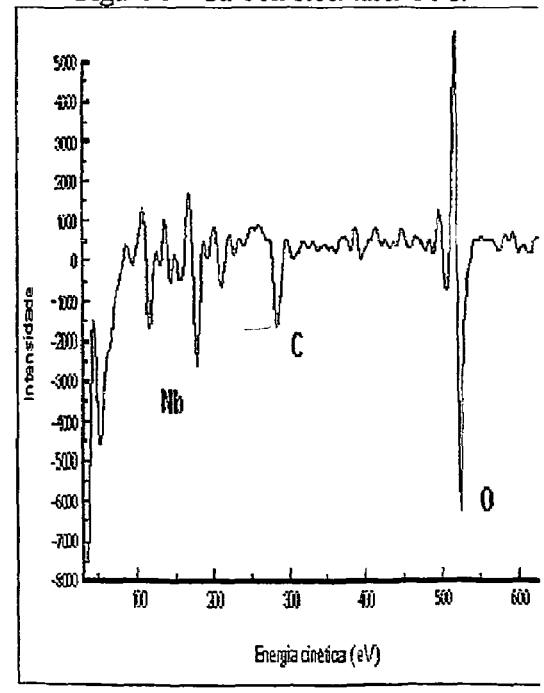
Figure 5 - Niobium later 30 s.

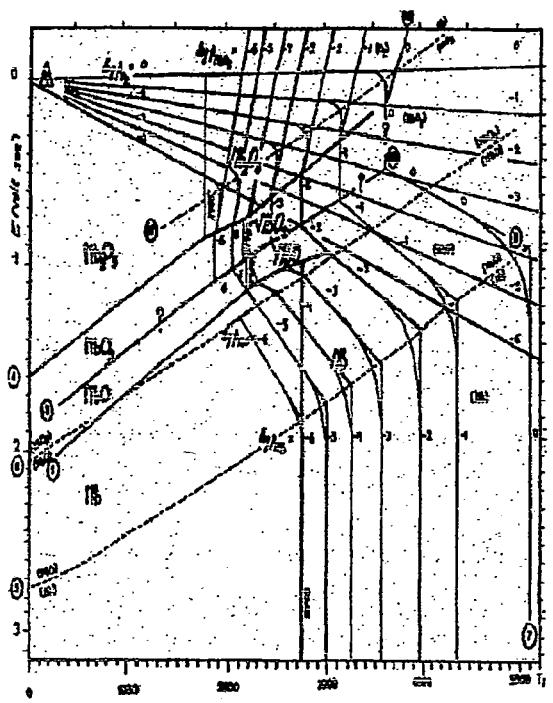 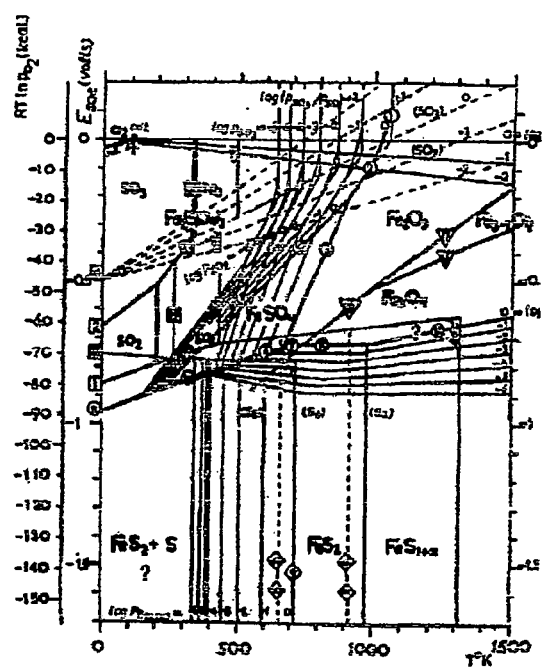
Figure 6 - Thermochemical diagram for Nb-O system.
Figure 7 - Thermochemical diagram for Fe-O-S system.

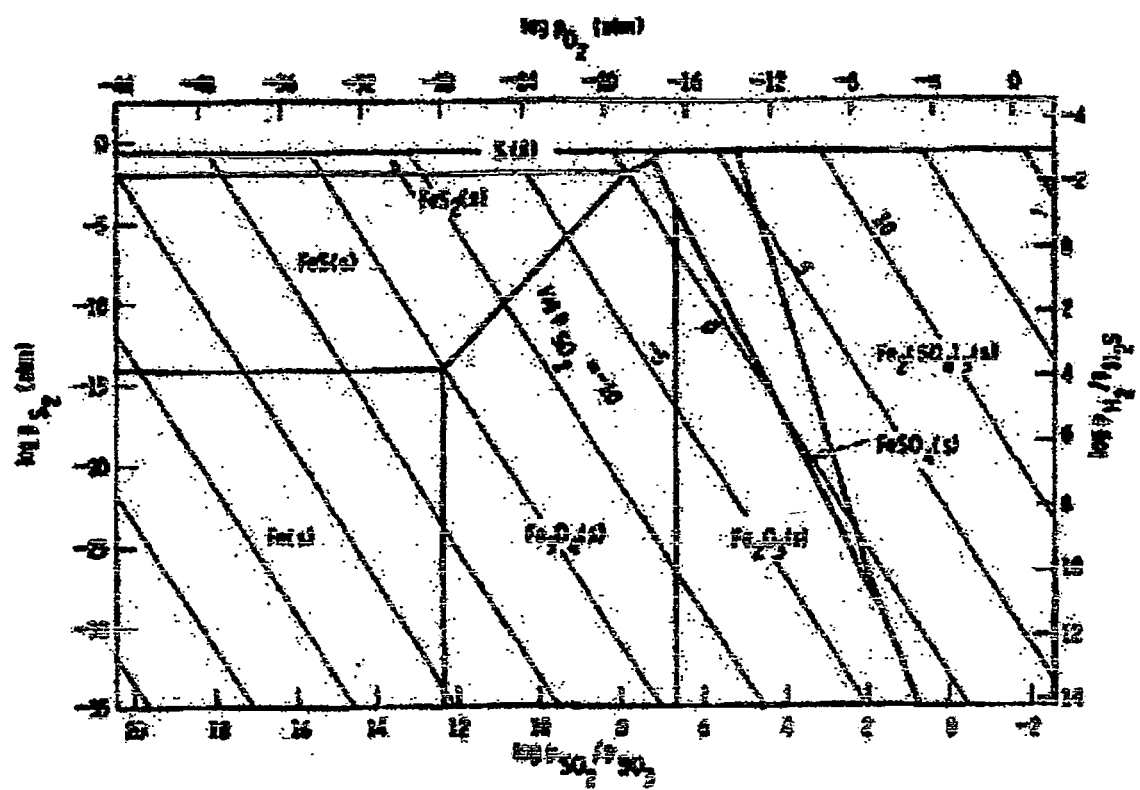
Figure 8 – Termochemical diagram for S-Fe-O system. [8]

NIOBIUM BASED PAINTS AND COATINGS, ITS OXIDES AND ANTICORROSIVE USE

TECHNICAL FIELD

The innovation refers to paints and coatings based on Niobium, its oxides and possible associations with other oxides, and its use made by the usual painting technique and not by the electro deposition technique by founded salts or equivalents, used in galvanoplasty. The invention purpose is to neutralize the high corrosive effects of naphthenic acids and sulfur compounds which rapidly destroy the carbon steel and special alloys such as the stainless steel of, practically, all the chromium and nickel alloy families.

FORMER TECHNIQUES

The corrosion by naphthenic acids has been, for years, a serious problem in the oil refining industry. The first case was observed in 1920 and for 35 years, it lingered on without any specific studies. W. A. Derungs reported one of the first works, presenting problems occurred in refineries caused by the attack of naphthenic acids and sulfur compounds. The literature makes reference to the naphthenic corrosion in the refining of some crude originated in India, Russia and Venezuela. In Brazil, the problem has been detected during the processing of the national oil, reaching high corrosion rates close to 7 mm/year.

The literature also mentions that this type of corrosion occurs when the petroleum presents total acid number (TAN) equal or higher than 0.5 mg KOH/g crude in temperatures varying from 220 to 440° C. and in high draining speeds. These speeds reach from 60 to 100 m/s in the refining process. An additional problem is that the corrosion caused by the brimstone(sulfur) compounds could also occur under the same conditions as the naphthenic corrosion.

Many materials have been tested on the field and presented poor performance under most operating conditions. Due to these results, we introduced the niobium in the oxide form as an alternative coating that could be used in the combat to naphthenic corrosion.

There is very little reference about the niobium utilization as a protector agent against the corrosion; however, it is known to exist a request for a French patent, originated from the doctorate thesis of A. TRAVALLONI—"Depot Eletrolytique de Niobium a partir de Fluorures Fondus"—Pierre et Marie Curie University—Paris (1978), based on the electro deposition by founded salts with pyrochlore base. Likewise, it is well documented in the technical literature the niobium utilization as an anticorrosive element, but also as a favorable element to resist to cold fragility.

Following, we will present the experimental evidences that confirm the niobium resistance in the petroleum presence.

To simulate the operational conditions of a refinery, some essays were carried out according to the ASTM G1.05.04 norm, that basically consisted of the immersion of the material pieces to be studied. In our case, we studied carbon steel, AISI 410 steel, 9%-Cr steel and the metallic niobium. We used an oil as a corrosive medium with TAN bigger than 0,5 mg KOH/g and total sulfur of 0,5% m/m.

FIG. 1 illustrates, in graphic form, the behavior of the essayed materials in autoclave, with the vertical axle representing the corrosion rate (mm/year) and the horizontal one representing the initial pressure (psi).

With the aide of X-ray diffraction and of the Auger's spectroscopy, it was possible to verify the main constituents of the films. The evidence was that a sulfide film (Pyrrhotite or Troilite) was formed on steel while a film of niobium oxide was formed on the niobium ($Nb_x$ e $O_y$). FIG. 2—carbon steel surface, FIG. 3—carbon steel after 3s, FIG. 4—niobium surface and FIG. 5—niobium after 30s present the results of the Auger's spectroscopy, but in all figures the vertical axle represents the intensity and the horizontal axle represents the kinetic energy (eV).

Under the oil production conditions, the presence of naphthenic acids as corrosive agents is observed since their pre-heating, around 200 to 250° C., up to the distillation operations, that are carried out at the refineries with temperatures around 300 to 350° C. and pressures at the atmospheric pressure level. Under these conditions, the water presence is unlike to occur—measured by the so-called "B.S.W. index"—taking us to use a thermodynamic theory in high temperatures, where the water fugacity ($H_2O_y$) is not taken into account.

The analysis made on the corrosion products revealed the FeS presence, more precisely of Pyrrhotite ($Fe_7S_8$) and of Troilite (FeS), in the scope of our experiments, by the X-ray diffraction as well as by Auger's spectroscopy. As above mentioned, in that niobium case, the essays disclosed that there is always niobium oxide formation and, in test conditions, the $H_2S$ attack is not taken into account.

The results suggest that the niobium oxide ($Nb_xO_y$) presents high probability of a protecting performance, once that the formed film is adherent, is not voluminous and is chemically inert in the corrosive medium.

FIG. 6 represents the thermochemical diagram for the Nb—O system and shows that the stable oxides, sensitive to react to the niobium in high temperatures and pressures, are: NbO, $NbO_2$, $Nb_2O_5$, in increasing order of oxidation. We also observed, at the temperature of 330° C. used in our essay, the potential values ($E_{soe}$) of −1,8V in relation to the oxygen and gas electrode.

The presence of $Nb_xO_y$, demonstrated by the Auger's spectroscopy analysis, came to ratify the results presented in FIG. 1 as being an extremely protecting oxide in naphthenic medium +$H_2S$.

In effect, we observe in this figure that the corrosion rate of oxidized niobium—NbO—is around 0,001 mm/year, in contrast to carbon steel that, for the initial pressure of 70 psi is around 0,008 mm/year, as well as for the AISI 410 steel (0,600 mm/year) and for the 9%-Cr steel (0,500 mm/year). Even under essay conditions, the lightest (20 psi), the good performance of the niobium is evident.

As for the iron behavior in experimental tests, we observed an extremely high corrosion of this material with the presence of FeS and $Fe_7S_8$ as corrosion products. The thermodynamic explanation for the presence of these products could be easily deduced in the Fe—S—O diagram, chemically inert in this corrosive medium. These results introduce the metallic niobium and their oxides, as materials with potential to be explored for the use as a coating at the oil refining units.

INVENTION SUMMARY

In its most general aspect, the present invention propose compositions which include pigments, resins, charges, solvents and others components, comprising a painting method able to be applied on carbon steel surfaces and other metallic materials of common use in the petrochemical industry.

DETAILED DESCRIPTION OF THE INVENTION

The present invention specifically refers to formulations consisting of a choice of resins and compatible pigments among themselves, so that the paint complies with normal standards of fluidity, covering power, homogeneity, coloring, electrochemical potentials, CPC and adequate CPVC.

The basic resin is of the epoxy family for temperatures up to 100° C., however, it can be utilized the basic resins of the silicone family for temperatures up to 600° C.

The pigments are of the niobium oxides family, generically described as $Nb_xO_y$, with X varying from 1 to 2 and Y from 1 to 5.

The above mentioned components obey the following features:

RESINS

Epoxy: They are obtained by the reaction between epichlorhydrin and bisphenol. The paints produced with this resin have two components, one having the pre-polymer epoxy, and the other one having the cure agent which is, generally, one amine or amide. The drying or cure of the epoxy paint occurs by the polymerizing (condensation) process. For a perfect performance, it requires a complete surface cleaning, being usual the application over a blasting to the almost white or white metal.

Silicon: Are semi-organic resins where silicium atoms are found in their molecules. The paints made with these resins are indicated for surface painting at temperatures higher then 120° C., and could be used for equipment painting at temperatures up to 500 or 600° C. The cure should be made by the equipment warming, generally made at the rate of 50° C. per hour.

| PIGMENT: | |
|---|---|
| Fusion point: | 1520° C. |
| Density: | 4.47 g/cm³ |
| % $Nb_xO_y$: | 99.4 |
| Sulphur ppm: | 10 |
| Fe ppm: | 229 |
| Pb ppm: | <1 |
| Granulometry: | −45 to 5.6 μm |

The compatibility between resins and pigments is carried out through charges, as for the silicate family.

The proposed formulations refer to the examples 1 and 2, and consist in the blend of two components, denominated A and B. The preparation of each component is made according to the procedure below.

To prepare component A, initially we dissolve the resin, if it is dry base, otherwise it could be presented as in FIG. 7 (thermochemical diagram to the Fe—O—S system).

In fact, according to this diagram, for the operational conditions of our tests and for the same calculated value of $E_{soe}$ (in the case of Nb—O with −1,5V), the estimated value for the oxygen pressure is $10^{-68}$ atm. We observed on this diagram that regions with potentials below −0,95V are sulfide stability regions, therefore showing that in our tested scene we have few probabilities to obtain any iron oxide.

These results are according with the EARL and SVEN works, which represent the Fe—S—O balance (FIG. 8—thermochemical diagram for the S—Fe—O system), at the temperature of 800K, where the stability regions of the iron, its oxides and sulfides are shown. On this diagram, we verify that on the sulfides stability field, the oxygen pressures are very small and the sulfur pressures vary from 1 to $10^{-15}$ atm, while the $P_{H2}/P_{H2S}$ is proportion is from $10^{-1}$ to $10^3$ atm.

As for the sulfide presence, it is important to stress that presently, the refineries are processing the oil with high sulfur content, and when the conditions are favorable to the sulfides formation, the equipment suffers severe attacks, what can be translated in factors such as the steel type, the temperature and the draining speed, as mentioned before.

Finally, the results show that under severe attack conditions on the steel with the presence of naphthenic acids and the sulfur compounds, the niobium keeps immune or inactive. The niobium oxide is adherent, protecting and used in a resin already dissolved. To the proposed compounds we used one epoxy resin with 24,1% of weight (example 1) and 19,2% associated with one silicon resin with 4,8% of weight (example 2). Next anti-sedimentation components and niobium oxide were added, with a variable percentage ranging from 30 to 40% in weight. Sequentially, a vegetal oil was added (1,32% weight) and finally a little of solvent to adjust the mixture viscosity. This adjustment can be made using a cup Ford 4, where the ideal adjustment ranges between 17 to 23 seconds (examples 1 and 2).

The preparation of component B consists in mixing the polyamide (72,2% weight) and amine (5,1% weight) with acetone (22,7% weight). When the two components A and B are made, they are mixed at the proportion of 8:1.

To prepare the paint we could use two procedures described below.

PROCEDURE 1

Using an ironclad ball mill, add all the components and grind for 3 to 5 hours to obtain the paint uniformity.

PROCEDURE 2

Using a plain ball mill, dissolve the resin with solvent by a moderate mechanic shaking method (500 to 700 rpm). When the resin is thoroughly dissolved, add the other components and continue shaking again until the mixture reaches a homogeneous state. The mixture is then taken to the milling to obtain the niobium based paint.

The final product must be stored in a dry and ventilated place, protected from the solar rays at a room temperature lower then 46° C. (examples 1 and 2).

In the example 3 we present the formulation of a mono-component paint, that basically consists of mixing a silicon resin (50% weight) with the niobium oxide (50% weight).

The present invention is now illustrated by the examples below. The % notation refers to the weight percentage, based in the total weight of the combination.

EXAMPLE 1

| Component A | |
|---|---|
| Epoxy | 24.1% |
| Niobium oxide | 36.1% |
| Acetone | 36.1% |
| Pearly silica | 2.4% |
| Castor oil | 1.3% |
| Component B | |
| Polyamide | 72.2% |
| Amine | 5.1% |
| Acetone | 22.7% |

EXAMPLE 2

| Component A | |
|---|---|
| Epoxy | 19.2% |
| Silicone | 4.8% |
| Niobium oxide | 36.1% |
| Acetone | 36.1% |
| Pearly silica | 2.4% |
| Castor oil | 1.3% |
| Component B | |
| Polyamide | 72.2% |
| Amine | 5.1% |
| Acetone | 22.7% |

EXAMPLE 3

| | |
|---|---|
| Silicone | 50% |
| Niobium oxide | 50% |

To obtain the paint according to the formulations above, it is enough to mix the pigment to the resin, anti-sedimentary components, dispersants and solvents.

Once the paint is obtained, it can be applied up to 6 hours according to the resins characteristics, thus assuring the paint stability for application. It can be applied using a regular paint brush, pistol or roll.

Warnings—Some procedures should be observed during the painting process: a) the surface temperature should be at 3° above the dew point and at a maximum value 50° C. b) the relative humidity should be near to 85%.

As for the surface preparation, preferably it should be used a SA 2,5 or SA 3 jet blast. In the impossibility of blasting a mechanic treatment according to ST3 pattern can be used.

The present paint should have for each coat, 180µ of humid pellicle obtaining a dry pellicle of 100µ.

After the application, the paint must present the characteristics below.

A) Electrode potential: up to 100° C., the electrochemical potential measured according to the saturated calomel, must present the value of $-700$ mV$_{ecs}$.

B) HCl instillation of P.A purity:—it should not present deteriorations on the paint coating. If it presents a yellow oxidation it is a normal a characteristic of the oxide reaction.

The present invention does not limit the compositions presented in the examples, but we could extend the compositions containing, besides the niobium oxide, others oxides, like aluminum, zinc and chromium oxides, among others.

What is claimed is:

1. A niobium based coating composition comprising:
   an epoxy resin for use of the composition at temperatures up to 100° C.; and
   a pigment including niobium oxide, the niobium oxide having the general formula $Nb_xO_y$, wherein x is an integer from 1 to 2 and y is an integer from 1 to 5;
   the pigment characterized by a fusion point of 1520° C., a density of 4.47 g/cm$^3$, 99.4% $Nb_xO_y$, up to 10 ppm sulphur, up to 229 ppm iron, less than one ppm lead, and a granulometry between $-45$ and 5.6 µm;
   wherein the compatibility between the resin and the pigment is obtained through charges, and the coating is a bi-component coating including a component A and a component B;
   component A including, by weight, 9.2 to 24.1% of said resin; 30 to 40% of said pigment, 20 to 30% acetone, 2.4% pearly silica, and 1.3% castor oil;
   component B including, by weight, 70 to 80% polyamide, 5 to 6% amine, and 20 to 30% acetone.

2. A method of using the niobium based coating composition of claim 1, the method comprising:
   applying the coating at a place of utilization of an object being coated, wherein it is not necessary to remove pieces or parts of the object to other spaces where the atmosphere is controlled.

3. A niobium based coating composition comprising:
   a silicone resin for use of the composition at temperatures up to 600° C.; and
   a pigment including niobium oxide, the niobium oxide having the general formula $Nb_xO_y$, wherein x is an integer from 1 to 2 and y is an integer from 1 to 5;
   the pigment characterized by a fusion point of 1520° C., a density of 4.47 g/cm$^3$, 99.4% $Nb_xO_y$, up to 10 ppm sulphur, up to 229 ppm iron, less than one ppm lead, and a granulometry between approximately $-45$ and 5.6 µm;
   wherein the compatibility between the resin and the pigment is obtained through charges, and the coating is a bi-component coating including a component A and a component B;
   component A including, by weight, 9.2 to 24.1% of said resin; 30 to 40% of said pigment, 20 to 30% acetone, 2.4% pearly silica, and 1.3% castor oil;
   component B including, by weight, 70 to 80% polyamide, 5 to 6% amine, and 20 to 30% acetone;
   whereby the composition inhibits corrosion caused by organic acids, particularly napthenic acids in sulfide medium.

4. A method of using the niobium based coating composition of claim 3, the method comprising:
   applying the coating at a place of utilization of an object being coated, wherein it is not necessary to remove pieces or parts of the object to other spaces where the atmosphere is controlled.

* * * * *